(12) United States Patent
Gibson et al.

(10) Patent No.: US 8,073,301 B2
(45) Date of Patent: Dec. 6, 2011

(54) LOW LOSS OPTICAL FIBER DESIGNS FOR CONFINING OPTICAL POWER TO LOW-DOPED REGIONS

(75) Inventors: Lance Gibson, Plymouth, MN (US); David Peckham, Lawrenceville, GA (US); Robert Lingle, Jr., Norcross, GA (US)

(73) Assignee: OFS Fitel, LLC, Norcross, GA (US)

( * ) Notice: Subject to any disclaimer, the term of this patent is extended or adjusted under 35 U.S.C. 154(b) by 230 days.

(21) Appl. No.: 12/381,302

(22) Filed: Mar. 10, 2009

(65) Prior Publication Data
US 2009/0232463 A1    Sep. 17, 2009

Related U.S. Application Data (62) Division of application No. 11/170,257, filed on Jun. 29, 2005, now abandoned.

(51) Int. Cl.
    *G02B 6/036*    (2006.01)
(52) U.S. Cl. .......................................... 385/127; 65/391
(58) Field of Classification Search .................. 385/126, 385/127, 123, 124, 128, 143, 144; 65/391, 65/397
See application file for complete search history.

(56) References Cited

U.S. PATENT DOCUMENTS

| | | | |
|---|---|---|---|
| 5,278,931 A * | 1/1994 | Antos et al. ................ 385/126 |
| 5,878,182 A * | 3/1999 | Peckham ...................... 385/123 |
| 6,421,489 B1 * | 7/2002 | Berkey et al. ............... 385/123 |
| 6,574,405 B2 * | 6/2003 | Mukasa ....................... 385/123 |
| 6,574,994 B2 * | 6/2003 | Cain et al. .................... 65/391 |
| 6,654,531 B2 * | 11/2003 | Gruner-Nielsen et al. ... 385/123 |
| 7,085,462 B2 * | 8/2006 | Mukasa ....................... 385/123 |
| 7,158,706 B2 * | 1/2007 | Matsuo et al. ............... 385/127 |
| 7,164,833 B2 * | 1/2007 | Jablonowski et al. ........ 385/127 |
| 2001/0017967 A1 * | 8/2001 | Hirano et al. ................ 385/123 |
| 2002/0181912 A1 * | 12/2002 | Gruner-Nielsen et al. ... 385/127 |
| 2003/0063878 A1 * | 4/2003 | Matsuo et al. ............... 385/123 |

* cited by examiner

*Primary Examiner* — Akm Ullah
(74) *Attorney, Agent, or Firm* — Peter V. D. Wilde, Esq.

(57) ABSTRACT

The specification describes an improved optical fiber produced by a hybrid VAD/MCVD process. The core of the fiber is produced using VAD and the inner cladding layer has a depressed index and is produced using MCVD. In preferred embodiments, the optical power envelope is essentially entirely contained in VAD produced core material and the MCVD produced depressed index cladding material. Optical loss is minimized by confining most of the optical power to the VAD core where OH presence is low, as well as by maximizing the optical power in the un-doped silica region. The MCVD substrate tube material is essentially devoid of optical power.

19 Claims, 5 Drawing Sheets

LOW LOSS OPTICAL FIBER DESIGNS FOR CONFINING OPTICAL POWER TO LOW-DOPED REGIONS

RELATED APPLICATION

This application is a division of application Ser. No. 11/170,257 filed Jun. 29, 2005 now abandoned.

FIELD OF THE INVENTION

This invention relates to a family of designs for optical fibers and methods for producing optical fibers employing those designs having improved optical transmission characteristics. More specifically it relates to a hybrid production method wherein optical fiber preforms are fabricated using a combination of MCVD and VAD techniques, wherein the VAD-MCVD interface is inside the waveguide-forming region of the refractive index profile design.

BACKGROUND OF THE INVENTION

A wide variety of methods have been proposed and explored for producing optical fibers. As optical fiber technology has matured, three main production methods, MCVD, VAD, and OVD have emerged. All involve the deposition of glass particulates (frequently referred to as "soot") on a starting substrate, then consolidating the particulates into a solid glass body. The techniques involve producing the particulates using an in situ vapor phase reaction. The vapor phase reaction is induced using a torch, and the flame of the torch is directed at the starting substrate. In the MCVD method, the torch is directed on the outside of a glass starting tube, and the glass precursor gases are introduced into the interior of a glass tube. The particulates are deposited on the inside surface of the tube. In the VAD and OVD methods, the torch and precursor gases are directed onto the outside surface of a starting rod and the particulates are deposited on the end or side of the rod, respectively. Each technique is highly effective, and widely practiced. Each has well known advantages over the other.

For producing very high quality central core and inner cladding material, the MCVD process would appear ideal. In the MCVD technique, the particulate layer grows incrementally in a radial direction. Due to this incremental radial growth, MCVD is capable of producing more complex refractive index profiles than the VAD method. Complex index profiles are produced by changing the radial composition of the particulate layer for each feature of the profile. Additionally, complex index profiles frequently have one or more features with a depressed (relative to pure silica) index. Depressed index regions are usually formed by doping the particulates with fluorine. As will be described in more detail below, the inside tube deposition method (MCVD) is more suitable for fluorine doping than the either of the outside rod methods (VAD or OVD).

However, the need for using a starting tube can be a limiting factor in the MCVD method. One limitation is when the glass in the MCVD starting tube is not of sufficient quality and low loss for large, state of the art, preforms (where some fraction of the optical power would be carried by the starting tube material). If the initial tube quality limitation is avoided by the use of ultra pure (and typically expensive) material to fabricate the starting tube, the exposure of the tube to the oxy-hydrogen torch typically used in MCVD as a heat source may compromise the effective starting tube quality by the addition of hydroxyl ions to a significant tube depth. Finally, the desired refractive index profile may require a dopant level in the region provided by the starting tube glass that is not compatible with successful MCVD processing (viscosity, tube stability or heat transfer considerations).

In VAD methods, the silica soot deposits and grows axially from a starting bait rod. A significant advantage of the VAD technique is that it can be practiced as a continuous process. This allows in-line deposition, purification, drying, and sintering. After deposition is complete, the starting rod is separated from the deposited body and the entire preform, unlike conventional MCVD, may thus be made of CVD-deposited material. As a general proposition, VAD methods are effective and widely practiced, but they still do not match the ability of MCVD to control precisely the radial deposition of index changing dopants, and thus the radial refractive index profile. Because of this, VAD methods and other soot deposition/subsequent sintering methods such as Outside Vapor Deposition (OVD) are limited in the complexity of the fiber designs that can be efficiently produced. Moreover, the VAD method is not well adapted for fluorine doping. This is especially the case for in-line VAD processes.

The recognition in the prior art that in a single mode optical fiber the core and inner cladding together carry greater than 95% of the optical power but typically comprise less than 5% of the fiber mass, has resulted in manufacturing processes that focus special attention on the fabrication of this region. Methods have evolved in which the core and inner cladding regions of the preform are produced by a relatively advanced and expensive method, while the outer cladding, the bulk of the preform, is produced by a less demanding, less expensive, process. The integration of the core rod and the cladding is carried out in an overcladding process. The overcladding process is described generally in U.S. Pat. No. 6,105,396 (Glodis et al), and PCT/EPT00/02651 (25 Mar. 2000), which are incorporated herein by reference for details of the general techniques.

The overcladding process overcomes some of the limitations in the complexity of preforms produced by the VAD technique. Overcladding may involve multiple overcladding tubes, each adding a distinct cladding region, to reach the desired complexity of the fiber refractive index profile.

A commonly used process of this type is the so-called rod-in-tube method, where the core rod is made by a very high quality dopant-versatile process, and the cladding tube is made of less expensive, lower purity, glass. In some cases, glass with a single composition provides a low cost choice. In the rod-in-tube overcladding process, the core rod is inserted into the cladding tube, and the tube collapsed around the rod to form a unitary body. Again, multiple overcladding steps may be used, and in some cases one or more of the final overcladding steps may be combined with the fiber drawing operation.

If a tube overcladding process is used, suitable cladding tubes may be produced by soot deposition or extrusion of fused quartz. Making these very large cladding bodies with a soot based synthetic glass process leads to high quality glass but requires extensive processing and is relatively expensive. Large bodies of fused quartz are less expensive, but are generally not of sufficient purity.

In summary, the VAD method when combined with the rod-in-tube overcladding methods provides a rapid and economical method for forming large glass core rods with relatively simple index profiles. However, where the cladding comprises depressed index features, commercially available depressed index cladding tubes of the prior art do not provide the desired optical quality for the overall preform body.

STATEMENT OF THE INVENTION

We have designed a set of optical fiber index profiles that reduce the level of dopant related excess scattering loss, and have developed a hybrid method for producing optical fibers using a combination of MCVD and VAD that significantly advance the prior art in terms of loss and high productivity. The hybrid method combines the desirable features of each processing technique. We have also noted the loss characteristics of optical fiber produced using these methods. Recognizing that the loss characteristics are different, we have combined the MCVD and VAD techniques to optimize the composite loss characteristic. The profile design can be optimized to distribute the optical power so as to reduce Rayleigh scattering, while achieving nearly zero water peak 1385 nm loss performance and maintaining good macrobending performance. In the preferred embodiment of the invention a VAD method is used to produce a core rod, with an up-doped inner core and a less heavily doped, or undoped, outer core. An MCVD method is used to produce a cladding with one or more depressed index regions. Using this basic preform fabrication approach, we adapt the profile and the optical power envelope such that essentially all of the optical power is contained in either the VAD material and the MCVD material, and most of the power envelope is contained in the VAD material, with for example typically 60% of the power contained in the VAD inner core, which has Ge-doping levels that are typically less than 60% of that found in standard single mode fiber cores, and with for example 20-40% of the power contained in the undoped or lightly doped VAD outer core.

A variation of this method is to substitute an ultra-high purity OVD tube for the MCVD cladding tube to produce a similar preform.

DETAILED DESCRIPTION

Low loss fibers with low or zero water peaks are effectively produced by the VAD or OVD methods in large economical preform sizes (greater than 90 mm OD). The lowest 1385 nm losses (specified less than 0.31 dB/km and typically 0.275 dB/km) are most consistently achieved with core rods produced by the VAD method, in preform sizes as large as 150 mm. The MCVD method is typically used to produce smaller preforms (60 to 90 mm) with somewhat relaxed water peak specifications compared to VAD. This commercial practice results from the fact that core material deposited by VAD or OVD is usually inherently more dry ([OH]<1 ppb) due to the dehydration of the soot prior to sintering. A second causative reason is that it is possible to make large bodies with large D/d ratios with VAD or OVD; this means that the first overcladding interface can be far away from the core (i.e. low optical power) in a large core body (much greater than 90 mm). The MCVD process normally produces to lower D/d ratios unless the preform size is small (<70 mm), making it more difficult to achieve economical, low or zero water peak fibers in large preforms.

Commercially produced fibers having dispersion at 1550 nm of approximately 17 to 20 ps/nm/km and a zero dispersion wavelength near 1310 nm can generally be divided into two types: Ge-doped core with silica cladding vs. silica core fiber with F-doped cladding. In either case, the total relative delta of the waveguide is approximately 0.35%. The former class of fiber is generally known as matched clad or standard single mode fiber, and have optical loss on the order of 0.185 to 0.195 dB/km. The latter class is usually known as pure silica core fiber and has very low commercial optical loss values near 0.168 dB/km, due to the lower Rayleigh scattering of pure vs. doped silica.

Although it has been demonstrated that silica core fiber has excellent loss characteristics, unfortunately, to achieve this level of performance requires draw speeds 5 to 10× slower than that for matched clad fiber. This restriction on draw speed impacts factory productivity and throughput, which makes silica core fiber more expensive to fabricate. This has effectively prevented its widespread commercial adoption, rendering it a niche product for undersea or long un-repeatered single-span applications.

As will be discussed below, the class of index profiles of this invention addresses these two limiting aspects of the prior art. In the prior art, either 1) the lower limit of the fiber loss is determined by the excess Rayleigh scattering level of the heavily Ge-doped core, as with conventional Ge-doped SSMF, or 2) the practical application space for the fiber is limited by extra cost associated with the need to draw the fiber at very low speed, as with pure silica core fibers. The class of index profiles in the current disclosure provides a means to achieve loss values that approach those of pure-silica fibers while maintaining the ability to draw these fibers at speeds normal for standard single mode fiber. Further, the hybrid VAD-MCVD process disclosed here is the preferred method for fabricating this class of index profiles.

Figure 1:
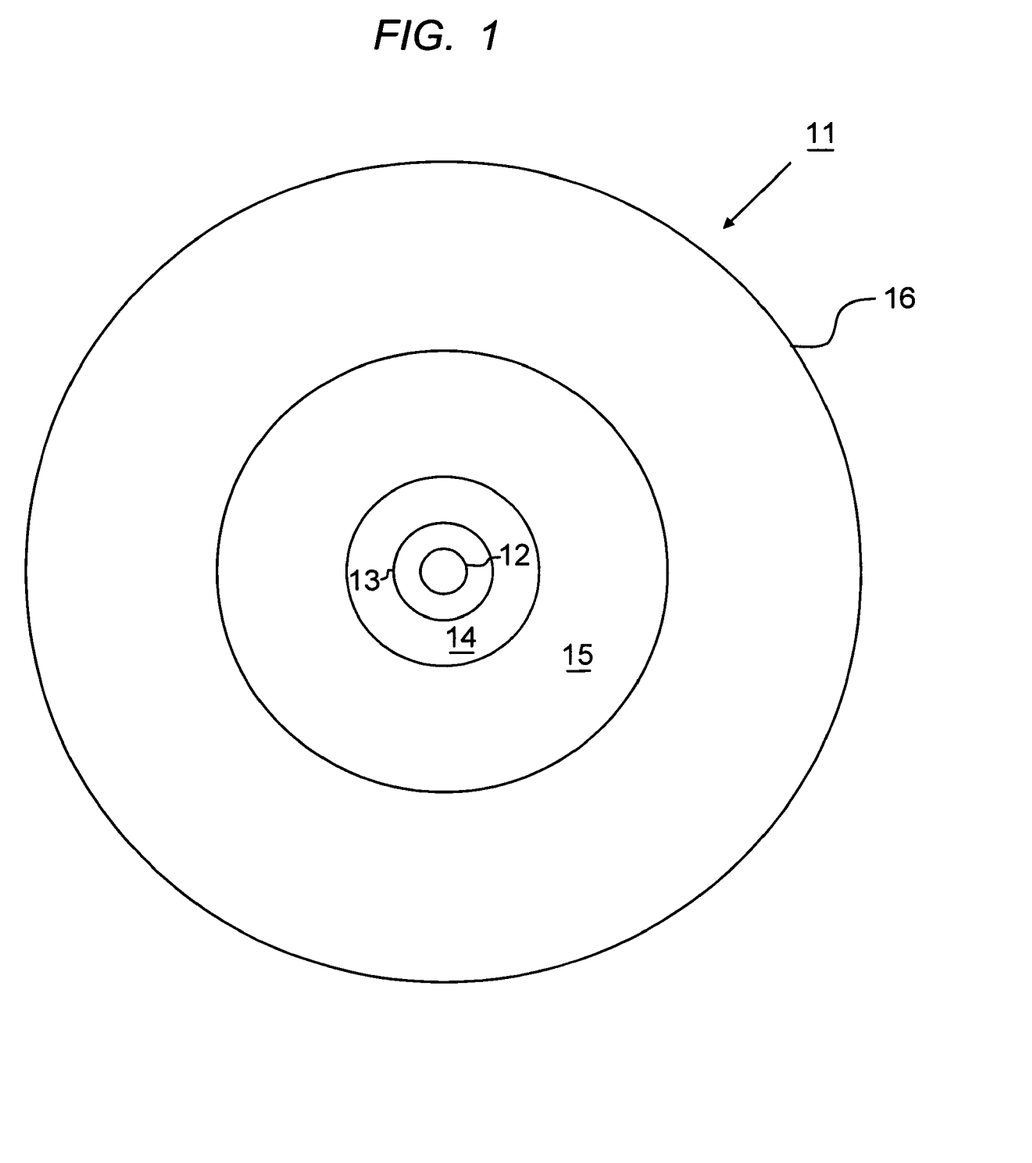
FIG. 1 is a schematic cross section of an optical fiber showing an example of a refractive index profile that may be made by the method of the invention.

Referring to FIG. 1, a cross section of an optical fiber preform 11 is shown with doped regions 12-16. The regions represent five different refractive indices, in individual layers that extend radially from the center of the fiber. This profile is representative of the complex index profile discussed above. Regions 13 and 16 represent the index of pure silica, and regions 14 and 15 are down-doped.

The optical fiber core region 12 is relatively heavily doped, typically with $GeO_2$. A second core region, 13, is a more lightly doped region, and in a preferred example, is intrinsic. (In this discussion, the glasses are assumed to be silica-based glasses, and the term "intrinsic" refers to undoped silica.) Cladding region 14 is a depressed (down-doped) region. Cladding region 15 is a less heavily doped depressed region, and region 16 is shown in this embodiment as an intrinsic region, but alternatively may be an extension of region 15.

Due to the presence of the depressed index region in this profile, the method of choice for preparing the entire preform for the optical fiber would typically be MCVD. This is because in the MCVD method it is relatively straightforward to dope the depressed region 14 with fluorine. Fluorine doping is normally achieved by exposing soot particles to $SiF_4$ (via introduction of $SiF_4$, $SF_6C_2F_6$, etc., as known in the art). This allows fluorine to diffuse into the porous glass structure and diffuse into the surface of the particulates. Because MCVD soot is deposited and sintered in a layer-by-layer fashion, the F does not diffuse away. Thus a relatively high level of F-doping as well as precise control over concentration profile can be achieved. For more detailed information on fluorine doping see co-pending application Ser. No. 09/755,914 filed Jan. 5, 2001.

This type of process may be incompatible with the some of the preferred VAD processes, especially those where the purification and consolidation steps are performed on an entire boule after soot deposition. Thus MCVD is often the preferred choice for making preforms with depressed index features in the profile. These profiles are important for low dispersion slope optical fiber, as well other state-of-the art optical fiber products.

Although these factors point to the use of all MCVD for making preforms with depressed index regions, we have found that important differences in the intrinsic levels of OH contamination in preforms made using VAD vs preforms made using MCVD may alter that conclusion. The OH content can be related to losses in relevant transmission or Raman pump bands, especially the S wavelength band between 1460 and 1530 nm, as well as in the 1385 nm window. The level of GeO and other loss producing defects may also be lower for VAD material with respect to MCVD material. In both cases we have measured better loss results for optical fiber drawn from VAD produced preforms. Accordingly, we have demonstrated the efficacy of producing the core region of an optical fiber preform, e.g. regions 12 and 13 of FIG. 1, using VAD, and the cladding regions 14 and 15 using MCVD.

Figure 2:
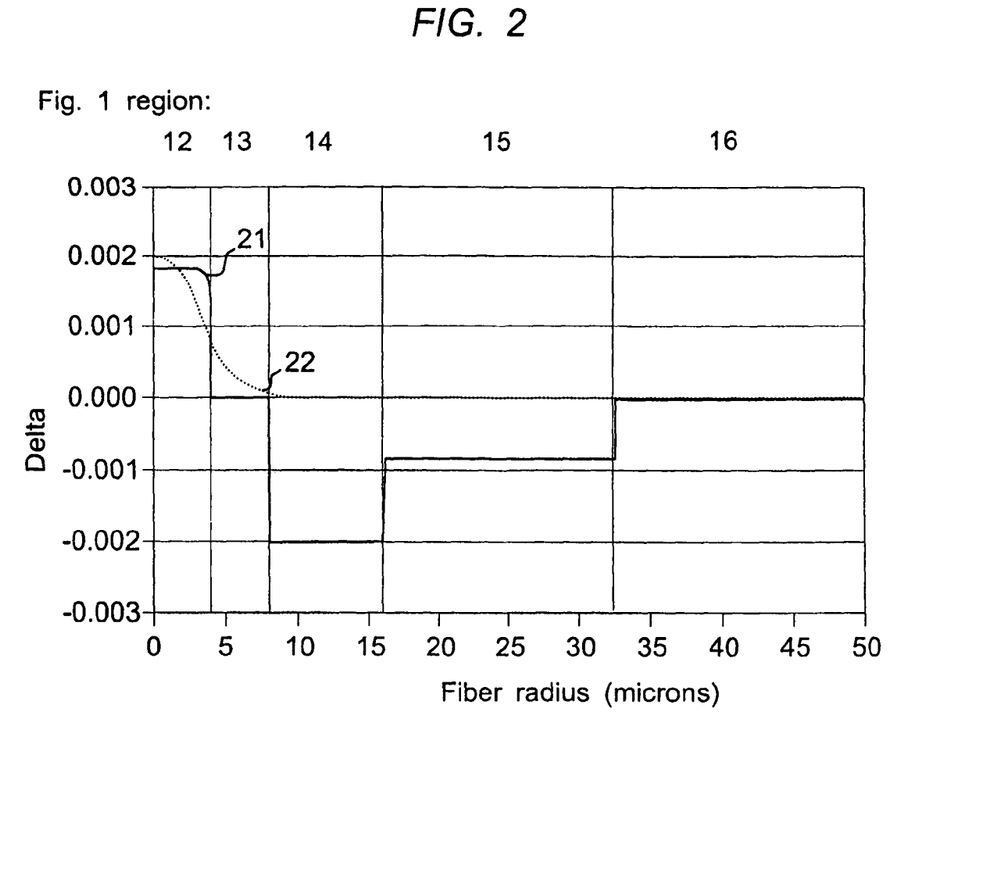
FIG. 2 is a plot of the profile of FIG. 1.

FIG. 2 shows a refractive index profile 21 for an optical fiber drawn from the preform represented in FIG. 1. Note that FIG. 1 represents a preform design profile (the preform OD is typically 63 mm), while the specific profile in FIG. 2 is the index profile for the optical fiber. Typically, optical fiber produced from a preform essentially replicates the preform profile, but with smaller dimensions.

Regions 12-16 in the preform of FIG. 1, from which the optical fiber of FIG. 2 is derived, are designated at the top of FIG. 2. The inner core region 12 is doped with Ge to produce an index at the core center of delta≅+0.002. Delta is the index deviation from the intrinsic index of silica. The ordinate in FIG. 2 is shown as an absolute index difference, but is often expressed as a percent by multiplying the values shown by 100. The index level of inner core region 12 will be recognized by those skilled in the art as relatively low compared with conventional single mode fiber, and can be achieved with less than 2 wt % Ge. In a typical single mode core the core center has doping levels of 3.5 wt % or more. The relatively low doping level of the core in the optical fibers of the invention reduces the optical loss in the fiber. The width of the inner core in this example is approximately 4 microns. The outer core region 13 in this example is intrinsic silica. Alternatively, the outer core may be lightly doped. It may be doped with Ge, for example, to a nominal level of less than +0.001. In yet another alternative embodiment, it may be lightly down-doped with fluorine. One objective is to produce an outer core layer with relatively low doping, thus resulting in a very low loss core material. A delta range of −0.001 to +0.0005 is suitable. The width of the outer core region is shown with the same width as the inner core region, i.e. approximately 4 microns. The next region is a depressed index region 14 with an index delta of about −0.002 and a width of about 8 microns. This region is produced using MCVD. The index of refraction in this region is typically approximately constant as a function of radius, but is not required to be flat. The depressed index region generally consists of $SiO_2$, doped with an appropriate amount of fluorine to achieve the desired index of refraction. Region 15 in this example is formed by the MCVD starting tube. The starting tube is slightly down-doped to an index of approximately 0.008. The width of this region, approximately 16 microns, is determined by the thickness of the starting tube. The last layer shown in FIG. 2 is undoped region 16. It is convenient to form this with an undoped overclad tube. However, to decrease the sensitivity of the fiber to bending losses it may alternatively comprise the same slightly down-doped material as region 15 and still retain the low loss, high draw productivity features of the invention. The optical transmission properties of this region are relatively inconsequential since essentially no optical power travels in this region.

The optical power envelope that represents the optical power distribution in the optical fiber example of FIG. 2 is shown at 22. The vertical scale is arbitrary. The optical power is strongly guided in the center region of the inner core 12 and declines exponentially, with an essentially Gaussian shape, through the outer portion of the inner core and through the outer core. At the interface between the core and the depressed cladding region 14, the power has decayed to a low value. One goal of the invention is to confine essentially the entire power envelope to the low loss VAD and MCVD regions. At the interface where the MCVD starting tube begins, i.e. the interface between regions 14 and 15, there is essentially no optical power. Thus the optical loss and other optical characteristics of region 15 are not as consequential as those of the inner layers where essentially the entire nominal power envelope is contained. Under some circumstances, for example when the fiber is subject to bending, the outer regions come into play, and aid in preventing loss. Consequently, the design of the regions beyond the MCVD trench layer 14 may have different compositions and properties than those shown. For example, region 16 may be down-doped to control bending loss. Or the MCVD starting tube may be doped to levels comparable to that for region 14. Other regions may be included, for example one or more ring regions of up-doped material.

Referring back to the power envelope 22 in FIG. 2, measured values of the relevant properties of this optical fiber is given in the following table. The power envelope for these data was measured at 1550 nm.

TABLE 1

| Region | Index (delta) | Radius (microns) | Power % |
|---|---|---|---|
| Inner core | 0.0018 | 4 | 60.3 |
| Outer core | 0.0 | 4-8 | 35.9 |
| MCVD trench | −0.002 | 8-16 | 3.8 |

Measurement of the power envelope at 1385 nm yielded a core power containment value of 97.8% and an MCVD layer power envelope of approximately 2.2%. As is well known, optical power decreases exponentially throughout the structure so the power envelope contained in the VAD/MCVD combined regions will not be 100%, but with the designs of the invention will be at least 99%.

The goals of the invention are generally satisfied for optical fiber having the prescriptions in the following table:

TABLE 2

| Region | Index (delta) | Radius (microns) | Power % |
|---|---|---|---|
| Inner core | 0.003 to 0.001 | 2-8 | 50-80 |
| Outer core | 0.001 to 0.000 | 3-10 | 20-40 |
| MCVD region | −0.0035 to −0.0007 | 5-25 | <5 |

In preferred embodiments, the combined inner core and outer core radius equals 5-12 microns.

A feature of profiles with these general designs is that, in addition to confining essentially all of the power envelope to the VAD/MCVD regions, the major fraction, >90%, and preferably >96%, is contained within the VAD regions, where both the OH content, and potential OH interface contamination, are small. The use of intrinsic silica, theoretically having optimally low loss, for a substantial portion of the core, and carrying a substantial fraction of the optical power, contributes significantly to the overall effectiveness of the design.

Figure 3:
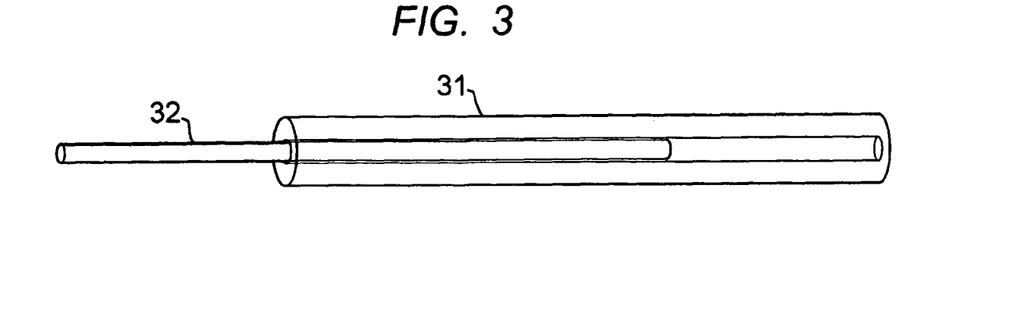
FIGS. 3 and 4 are schematic representations of a rod-in-tube process.

Preforms made with a VAD core rod and an MCVD cladding tube may be assembled using a rod-in-tube method. Typical rod-in-tube methods are described in conjunction with FIGS. 3 and 4. It should be understood that the figures referred to are not necessarily drawn to scale. A cladding tube representative of dimensions actually used commercially has a typical length to diameter ratio of 10-15. The core rod 32 is shown being inserted into the cladding tube 31. The tube 31 may represent a single tube or several concentric tubes. The rod at this point is typically already consolidated. The tube may be already consolidated or still porous. Normally, there exist several common options for the make-up of the core rod. It may be just the center core, or it may include one or more additional layers. In the main embodiment of the invention where the core rod is made using VAD the core consists of layers 12 and 13. Cladding tubes made with very high quality glass-forming techniques may be used for layer 14. However, in view of the limited availability of commercial available tubes with ultra-high purity, layer 14 is preferably produced using MCVD. The down-doped layer 14 is formed by a down-doped MCVD layer on the interior surface of a substrate tube 15.

Figure 4:
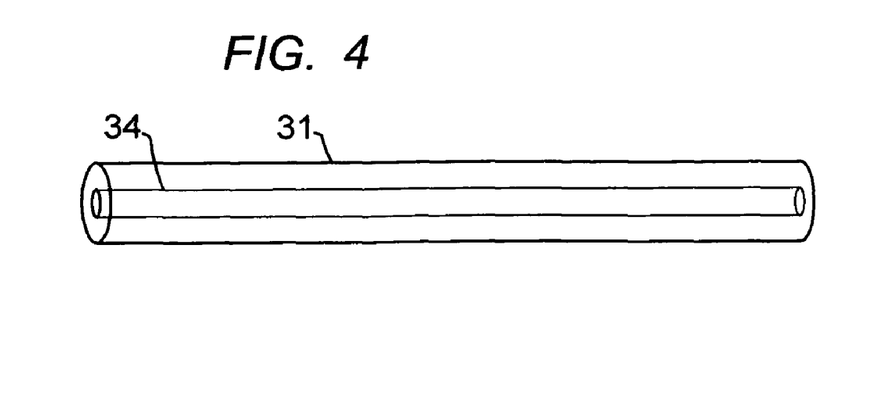

Referring to FIG. 4, after assembly of the rod 32 and tube 31, the combination is collapsed to produce the final preform, where the interface 34 between the outer surface of the rod and the inner surface of the tube is essentially indistinguishable. This step may occur either prior to or during the draw process.

Additional cladding operations, for example an added overclad tube for producing layer 16, may follow essentially the same procedure as the rod-in-tube method just described. Alternatively, the preform may be assembled by collapsing the overclad tubes(s), the MCVD tube, and the core rod, in one operation.

Figure 5:
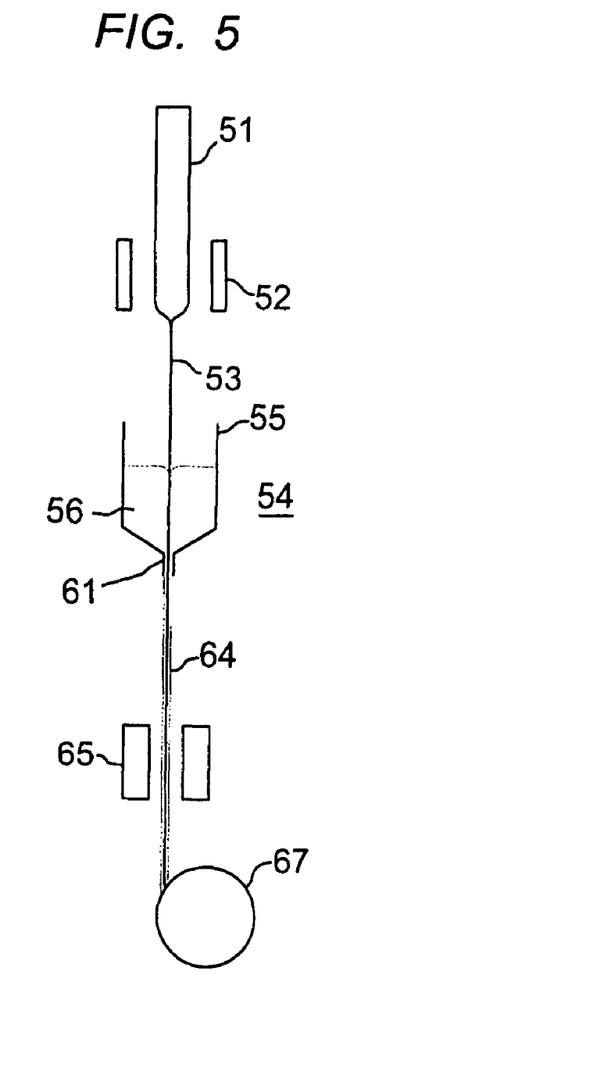
FIG. 5 is a representation of an optical fiber drawing apparatus.

The optical fiber preform, as described above, is then used for drawing optical fiber. FIG. 5 shows an optical fiber drawing apparatus with preform 51, and susceptor 52 representing the furnace (not shown) used to soften the glass preform and initiate fiber draw. The drawn fiber is shown at 53. The nascent fiber surface is then passed through a coating cup, indicated generally at 54, which has chamber 55 containing a coating prepolymer 56. The liquid coated fiber from the coating chamber exits through die 61. The combination of die 61 and the fluid dynamics of the prepolymer controls the coating thickness. The prepolymer coated fiber 62 is then exposed to UV lamps 63 to cure the prepolymer and complete the coating process. Other curing radiation may be used where appropriate. The fiber, with the coating cured, is then taken up by take-up reel 64. The take-up reel controls the draw speed of the fiber. Draw speeds in the range typically of 1-30 m/sec. can be used. It is important that the fiber be centered within the coating cup, and particularly within the exit die 61, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus of FIG. 5 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150-300 μm in diameter, with approximately 245 μm standard.

The positive effects of the invention were demonstrated in the context of known optical fiber loss mechanisms. The current state of art of fabricating and designing silica based fibers has progressed to the point where in the 1550 nm region the excess loss from absorption effects such as contamination by OH or trace metals or the presence of electronic defects in the glass structure or from waveguide effects such as bending losses have been essentially removed. Therefore, the lower limit of the loss of state of the art fiber is determined by the Rayleigh scattering loss of pure silica. The presence of the index changing dopants that are used to form the waveguide structure, e.g., typically Ge or F, has the detrimental effect of increasing the Rayleigh scattering loss of the doped glass above that of pure silica. Ohashi ("Optical Loss Property of Silica-Based Single-Mode Fibers", JLT Vol 10, No5, May 1992) determined that the Rayleigh scattering coefficient of silica fibers doped with Ge is:

$$A_{Ge} = A_0(1 + 0.44 * \Delta_{Ge}),$$

and for silica fibers doped with F is:

$$A_F = A_0(1 + 0.41 * \Delta_F),$$

where $A_0$ is the Rayleigh scattering coefficient of undoped silica, $\Delta_{Ge}$ and $\Delta_F$ are the normalized index differences associated with the Ge and F doping, respectively. These formula clearly show that silica doped with germanium and fluorine has an elevated Rayleigh scattering coefficient relative to that of pure silica, resulting in excess scattering loss. The class of index profile designs disclosed here are designed to have reduced levels of germanium and fluorine doping in the regions of the fiber that propagate the most significant portions of the optical power, relative to matched clad fiber designs, and therefore provide a means to reduce the fiber loss by reducing the Rayleigh scattering coefficient.

To quantify the effect on the fiber loss of the excess Rayleigh scattering loss of the doped regions of the waveguide above that of intrinsic silica, we define the excess scattering loss metric as the integral over the fiber cross section of the Ge and F doping concentration weighted by the optical power density.

$$\text{Excess scattering loss metric} \propto \frac{\oint \int Ge(r) * E^2(r) r dr d\phi + \oint \int F(r) * E^2(r) r dr d\phi}{\oint \int E^2(r) r dr d\phi}$$

where Ge(r) and F (r) are the Ge and F doping concentrations in units of weight percent as a function of radial position, r, E (r) is the electric field as a function of r of the fundamental mode.

Figure 6:
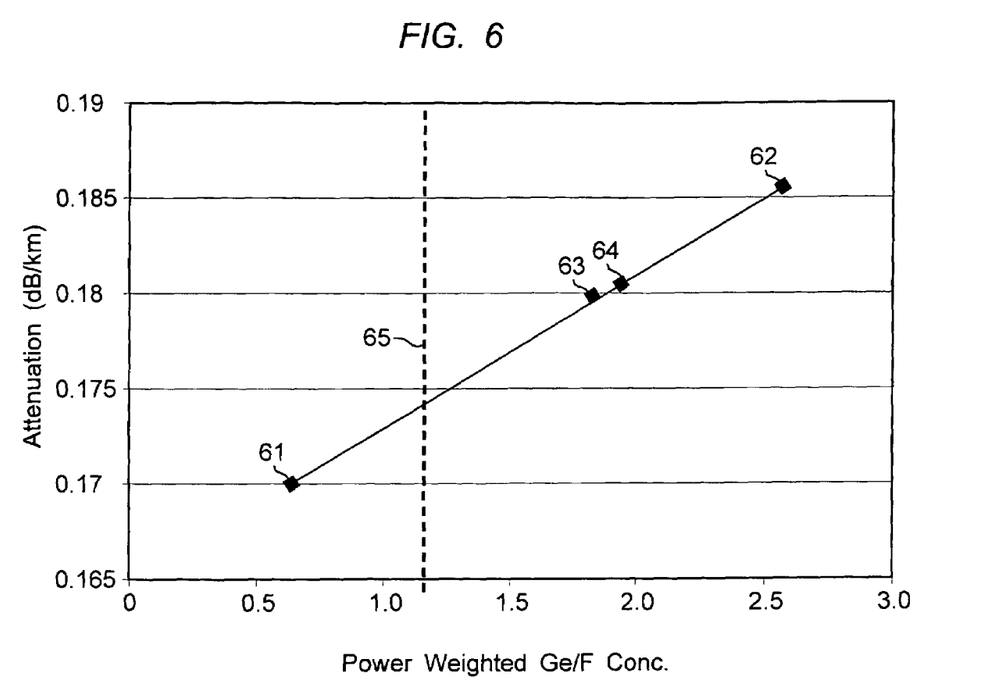
FIG. 6 is a plot of attenuation vs power weighted Ge and F concentration for various examples.

FIG. 6 shows a plot of the observed loss of various large effective area, non-dispersion shifted fibers versus the excess scattering loss metric. The points labeled 61 and 62 represent results for commercially available pure silica core and Ge-doped core fibers, respectively. Assuming that the fiber loss is dominated by Rayleigh scattering, then fibers with excess scattering loss metric between the value of these two example fibers will have fiber loss that falls approximately along line 65 which connects these two points. The points labeled 63 and 64 represent the results for two examples of the inventive fiber. The values of the excess scattering loss metric for these example fibers are slightly less than 2.0 and the measured loss values are about 0.180 dB/km. The preferred embodiment of the invention has the index profile shown in FIG. 2 with the value of the excess scattering loss metric of approximately 1.0 and expected fiber loss of 0.174 dB/km. The range of the integral of the power weighted doping concentration for the present invention typically falls within the range of approximately 1 to 2.

Figure 7:
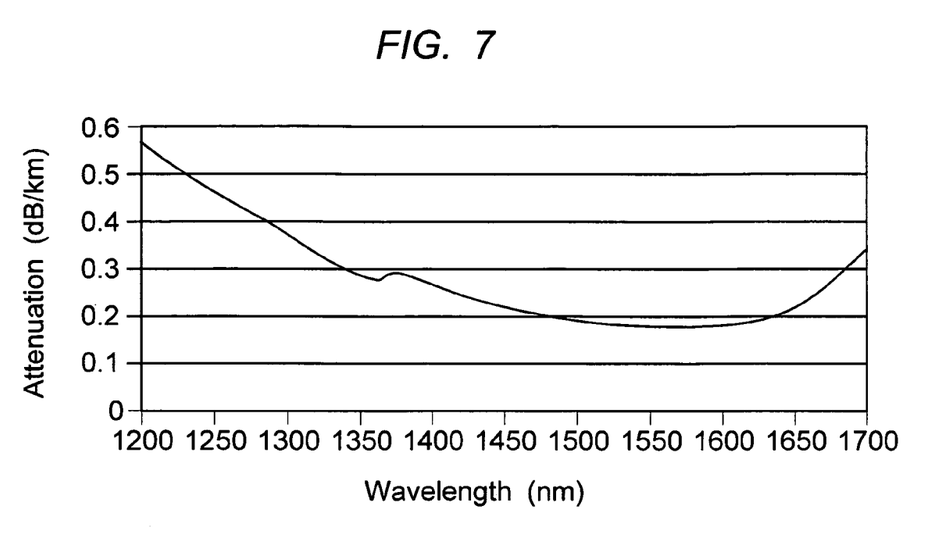
FIG. 7. is a plot of attenuation vs wavelength, often referred to as an attenuation spectrum for the optical fiber designated 63 in FIG. 6.

FIG. 7 shows the attenuation spectrum of the fiber represented by point 63 in FIG. 6, which was drawn at 18 m/s pulling speed. The attenuation of this fiber at 1550 nm and 1385 nm are 0.180 and 0.284 dB/km, demonstrating excellent low loss performance.

Another fiber loss performance issue that is related to the fiber index profile design and the fiber fabrication methods is the ability of the fiber to meet the Zero Water Peak (ZWP) properties. ZWP properties require very low initial loss at the OH absorption peak in the wavelength region around 1385 nm and stable long term aging loss when the fiber is exposed to molecular hydrogen over its operating lifetime.

Figure 8:
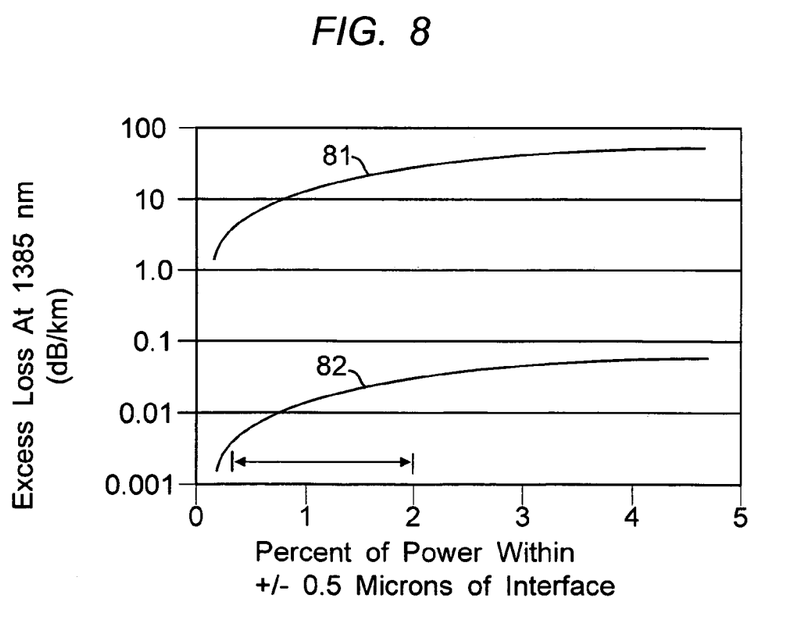
FIG. 8. is a plot of loss vs. power fraction showing the effect of different characteristics of a rod-in-tube interface.

An important aspect to providing ZWP properties is the extremely "dry" nature of the inner and outer core regions formed by the VAD deposition process (typically <0.5 ppb [OH]). In a preferred embodiment of the invention, typically >95% of the optical power propagates within the VAD formed regions of the fiber. Also important to providing ZWP properties is the very dry nature of the depressed index region adjacent to the outer core region. The dryness achievable with standard MCVD processing, [OH] concentration typically <3.0 ppb, provides sufficient performance for this region since typically only a few percent of the power propagates within this region. It is foreseeable that realization of these fiber designs with ZWP properties will be possible by forming the entire depressed index trench region adjacent to the core rod with ultra high purity, F-doped tubing that has [OH] contamination level comparable to that of material formed by MCVD processing. However, since the current state of the art of commercially available synthetic silica tubing results in [OH] contamination levels of about 200 ppb, these tubes are not currently commercially available. Another attribute of the invention in the context of ZWP performance is that more than 99% of the power propagates within the regions formed by VAD, MCVD or ultra high purity tubing. A fourth attribute of the invention in this context is that the percentage of the optical power that is contained within the 1 micron thick region centered about the interface between the VAD core rod and the first overcladding tube is less than about 2%, preferably less than 0.5%. It is preferred that processing of the core rod prior to overcladding and the overcladding steps be consistent with maintaining the average [OH]contamination across the 1 micron region centered about the interface at 20 ppb or less. This may require processing techniques such as furnace stretching in a dry environment, plasma and/or chemical etching of the rod and tube surfaces prior to overcladding and employing a drying agent such of chlorine to maintain a dry environment at the interface void during the overcladding process. FIG. 8 shows a calculation of the excess loss at 1385 nm resulting from OH contamination at the interface region as a function of the percentage of power propagating in the 1 um thick annulus centered at the interface. The two curves show the excess for the typical level of OH contamination observed when the dry overcladding processing described above and when more typical overcladding processing are used. For good ZWP properties, dry processing techniques are preferred, and when properly practiced should result in "interface" power of less than about 2%.

The reduction of loss from 0.185 for best-in-class standard matched clad fibers to ~0.175 dB for the invention disclosed here represents a 1 dB reduction in span loss for a 100 km terrestrial system, and ~0.5 to 0.7 dB for 50 to 70 km submarine system. This 1 dB in a terrestrial system represents an additional dB of margin which can be used to extend total system length or reduce the cost or specifications on other components. The zero (negligible) water peak loss extends the ability to place Raman pumps near 1385 nm, and the combination of low Rayleigh scattering loss and low water peak loss makes Raman pumping more efficient across the entire region from 1350 to 1450 nm. For the submarine case the additional 0.5 to 0.7 dB can be used to extend the distance between extremely expensive deep-sea repeaters, thus reducing the total number of repeaters required to span a given system length. This represents significant cost savings.

Fibers according to the present invention may be utilized with dispersion compensation modules based on negative dispersion fiber or higher-order mode fiber. They may also be deployed as an element of a dispersion-managed span, where the cabled fiber with positive dispersion (such as the present invention) is paired with a cabled fiber with negative dispersion and negative dispersion slope. The design of a dispersion-managed span usually places a segment of the positive dispersion fiber with large effective area immediately after the transmitter, to minimize non-linearity when launch power is maximum. The segment of smaller effective area negative dispersion fiber is spliced into the span after the optical power has been attenuated by fiber loss in the positive dispersion fiber to minimize non-linearity. For Raman amplified systems, the sequence may be modified: a segment of large effective area, positive dispersion fiber; followed by a segment of smaller effective, area negative dispersion fiber; followed by a second segment of large effective area, positive dispersion fiber.

Unrepeatered (i.e. unamplified) systems are often desirable in remote locations such as frontiers or between islands. In these systems, a combination of high launch power and distributed Raman amplification help to enable transmission over 200-300 km without an in-line optical amplifier. Such a system would have its transmission wavelength near the loss minimum of the fiber, usually around 1570 to 1580 nm. An optical fiber of the type disclosed herein has reduced signal band attenuation, produced more economically than pure, silica core fiber. It has negligible water peak loss, enabling placement of an advantageous second-order Raman pump at ~1375 nm, extremely close to where the water peak would be. It also can have a large effective area greater than 100 square microns to mitigate nonlinearities associated with higher launch power.

The new class of optical fibers disclosed herein will also be ideal for an emerging category of 10 Gbps (and faster) transmission systems that will use some form of signal processing to mitigate intersymbol interference due to chromatic dispersion. In these systems optical dispersion compensation will either be supplemented by or will be totally replaced by pre-emphasis at the transmitter and/or equalization at the receiver, with all signal processing done in the electrical domain. These electronic dispersion mitigation schemes respond best to linear, deterministic impairments. In this paradigm, the performance and cost of transmission systems will depend far less on mitigation of dispersion impairments and more on reducing attenuation loss and non-linearity. The category of fibers disclosed herein, such as with an effective area of 110 um2 and signal band loss of 0.175 dB/km can be calculated to yield two dB of performance improvement over standard matched clad fiber when used with such a system.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. An optical fiber having an index profile comprising:
    an inner core region having an index delta between 0.001 and 0.003;
    an outer core region having an index delta between −0.001 and 0.0005; and
    a trench region having an index delta between −0.0035 and 0.0007;
    whereby the index profile is shaped to provide an effective area that is greater than 100 μm$^2$ at 1550 nm and a transmission loss that is less than 0.180 dB/km at 1550 nm.

2. The optical fiber of claim 1 where the 1550 nm attenuation is less than 0.175 dB/km.

3. The optical fiber of claim 1 where the 1383 nm attenuation is less than 0.31 dB/km.

4. The optical fiber of claim 1 where the cable cutoff wavelength is less than 1260 nm.

5. The optical fiber of claim 1 where the cable cutoff wavelength is less than about 1530 nm.

6. The optical fiber of claim 5 where the 20 mm diameter macrobending loss is less than 2 dB/m.

7. The optical fiber of claim 1 where the inner core region has a radius of 2-8 microns.

8. The optical fiber of claim 7 where the outer core region has a radius of 3-10 microns.

9. The optical fiber of claim 8 where the first cladding has a radius of 5-25 microns.

10. The optical fiber of claim 1 wherein the inner core region and the outer core region have a combined radius of 5-12 microns.

11. An optical fiber for transmitting optical power in the 1550 nm wavelength region, the optical fiber having an index profile comprising:
    an inner core with a radius between 2 and 8 microns;
    an outer core with a radius between 3 and 10 microns; and
    a trench with a radius between 5 and 25 microns;
    whereby the index profile is shaped to confine: (i) 50-80 percent of the optical power within the inner core, (ii) 20-40 percent of the optical power within the outer core, and (iii) less than 5 percent of the optical power in the trench.

12. The optical fiber of claim 11 where the inner core has an index delta between 0.001 and 0.003; the outer core has an index delta between 0.000 and 0.001; and the trench has an index delta between −0.0035 and −0.0007.

13. The optical fiber of claim 12 where the 1550 nm attenuation is less than 0.175 dB/km.

14. The optical fiber of claim 12 where the 1383 nm attenuation is less than 0.31 dB/km.

15. The optical fiber of claim 12 where the cable cutoff wavelength is less than 1260 nm.

16. The optical fiber of claim 12 where the cable cutoff wavelength is less than about 1530 nm.

17. The optical fiber of claim 16 where the 20 mm diameter macrobending loss is less than 2 dB/m.

18. The optical fiber of claim 12 where the inner core region has a radius of 2-8 microns.

19. The optical fiber of claim 18 where the outer core region has a radius of 3-10 microns.

* * * * *